Sept. 30, 1958      C. R. MILLER      2,854,152
LUMBER STACKERS
Filed April 8, 1955      4 Sheets-Sheet 1
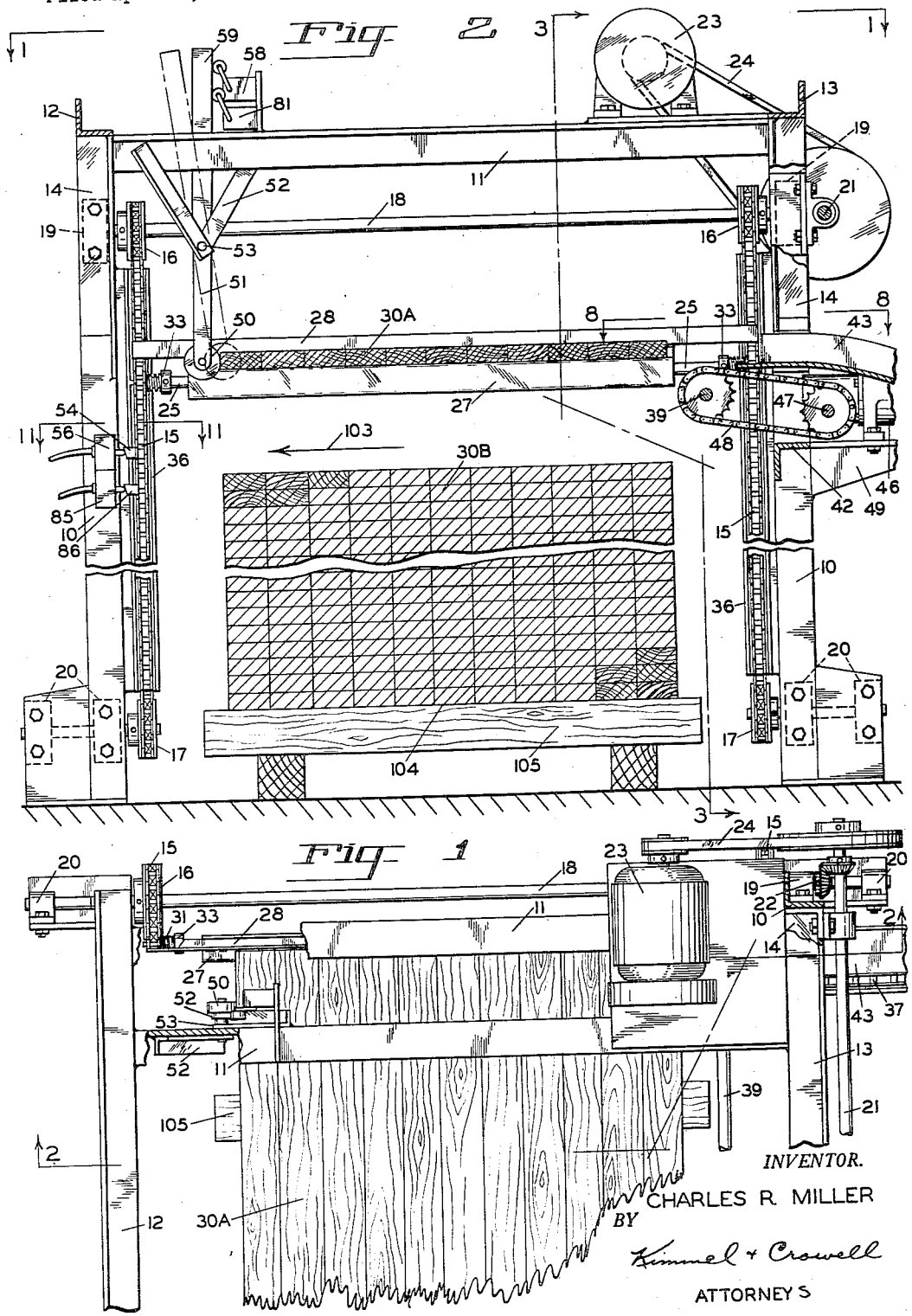
INVENTOR.
CHARLES R. MILLER
BY
Kimmel & Crowell
ATTORNEYS

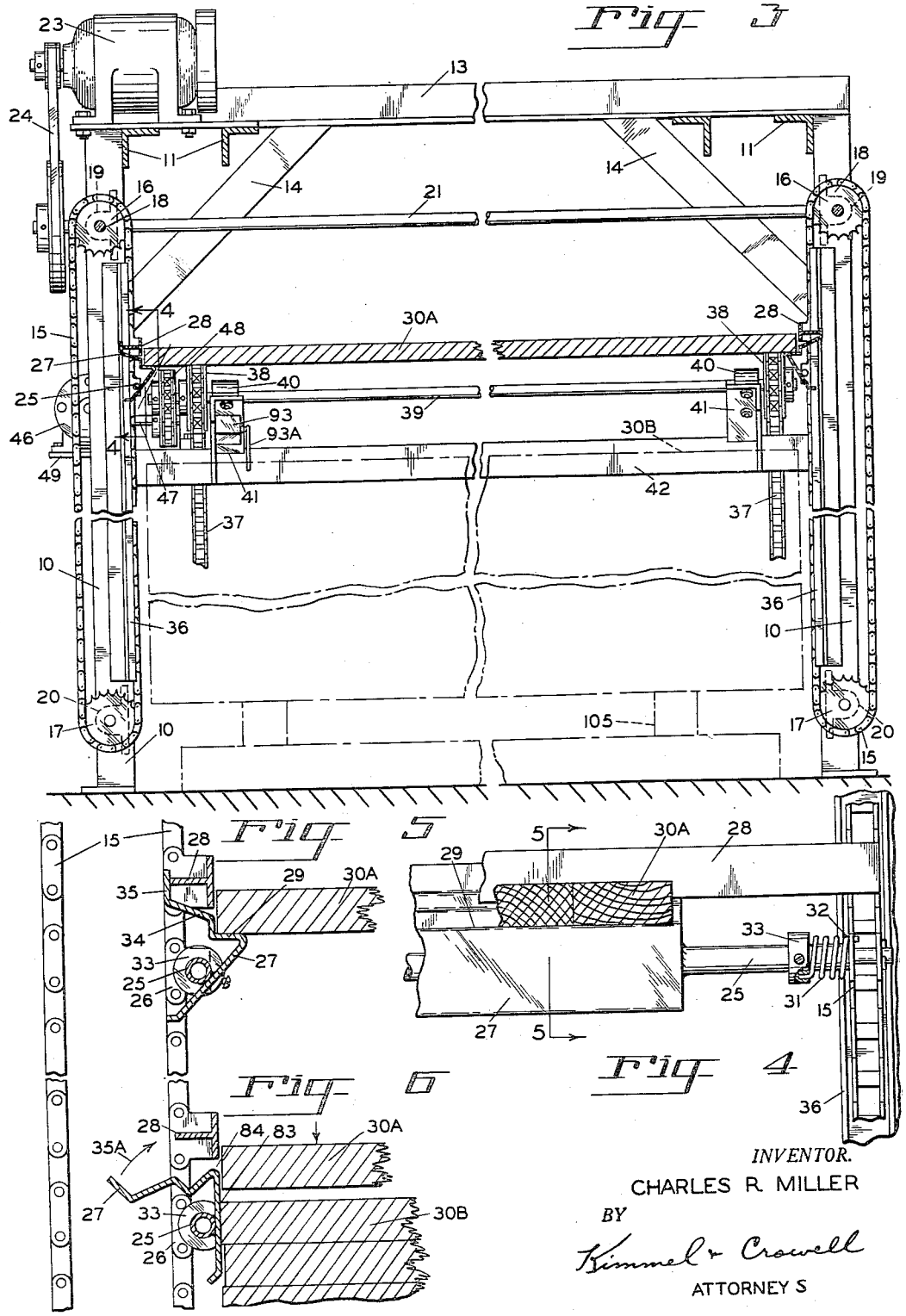

Sept. 30, 1958     C. R. MILLER     2,854,152
LUMBER STACKERS
Filed April 8, 1955     4 Sheets-Sheet 3
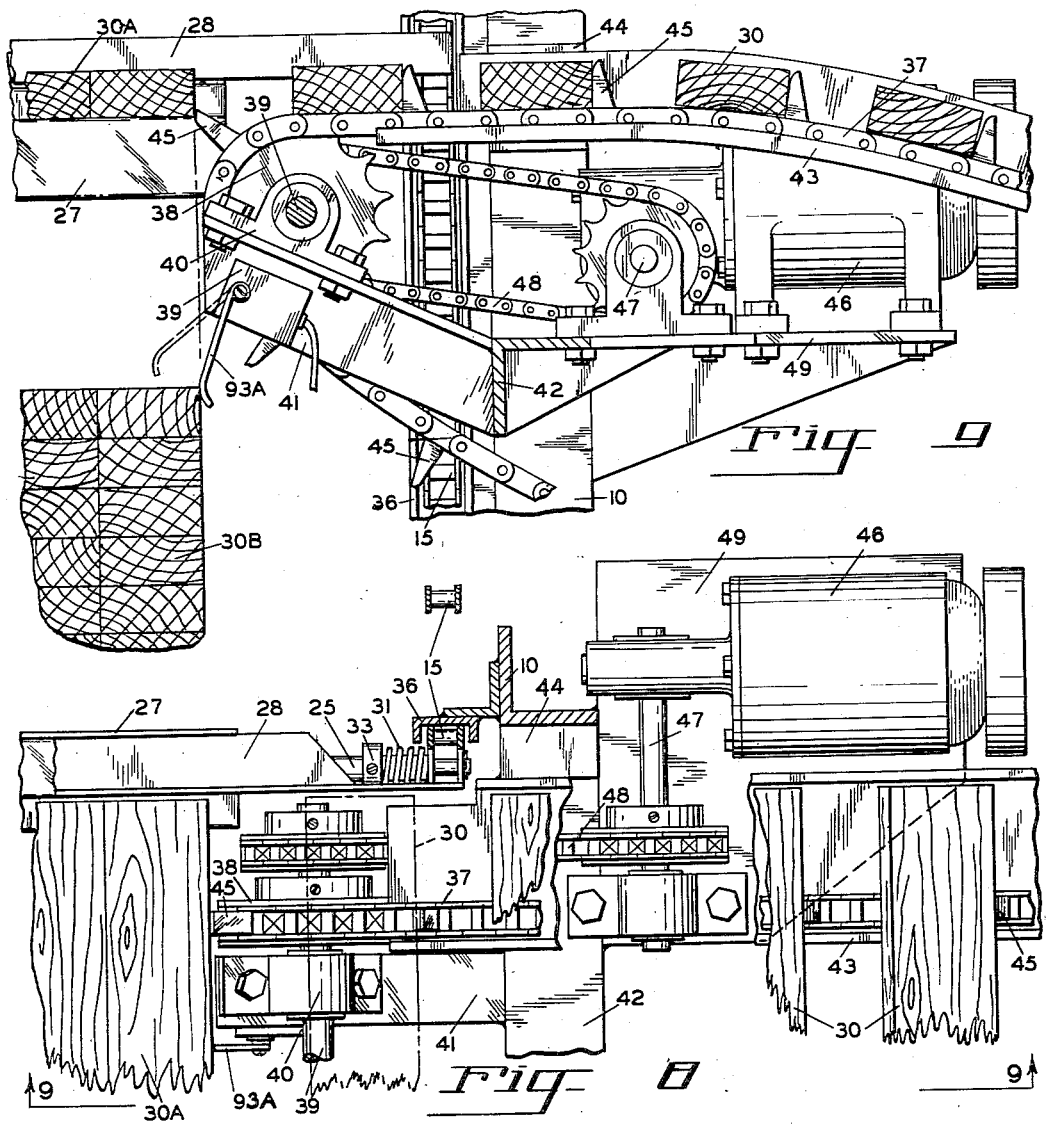
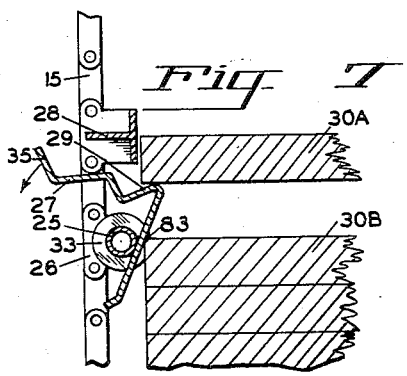
INVENTOR.
CHARLES R. MILLER
BY
Kimmel & Crowell
ATTORNEYS

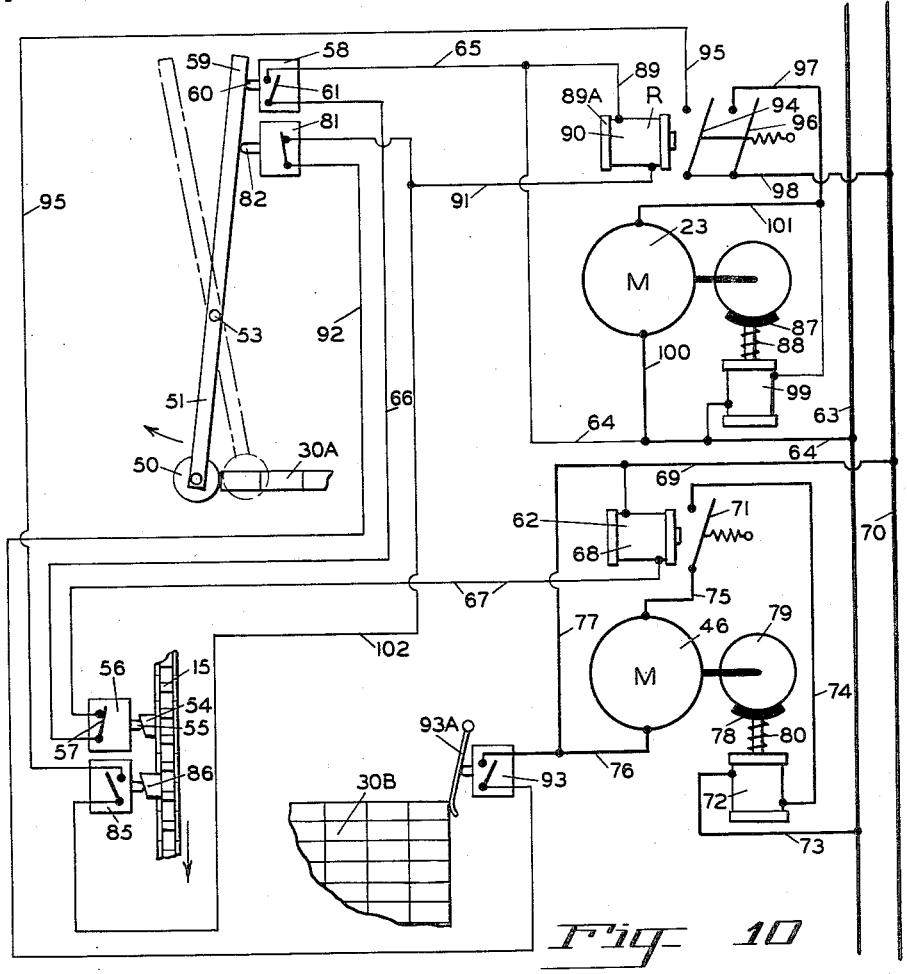
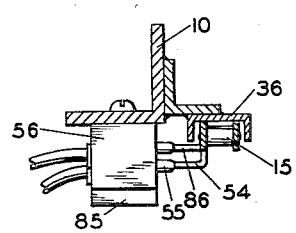

United States Patent Office 2,854,152
Patented Sept. 30, 1958

2,854,152

LUMBER STACKERS

Charles R. Miller, Drain, Oreg.

Application April 8, 1955, Serial No. 500,157

4 Claims. (Cl. 214—6)

This invention relates to lumber stacking machines, and more specifically, to a machine for piling green lumber stacks which may be picked up and moved by a lumber moving carrier to desired locations for storage.

One of the primary objects of this invention is to provide means for receiving green lumber from a conveyor and automatically piling the same into stacks until the stack has reached a predetermined height, at which time means become operable to automatically stop the receiving and stacking of the lumber.

Another object of this invention is to provide a machine of the type described which is inexpensive to manufacture, non-complex in construction and assembly, and durable in use.

Other and further objects and advantages of the present invention will become more evident from a consideration of the following specification when read in conjunction with the annexed drawing, in which:

Figure 1 is a fragmentary top plan view of a lumber stacking machine constructed according to this invention, the view being taken on the horizontal plane of line 1—1 of Figure 2, looking in the direction of the arrows, the conveyor, motor, and platform being omitted for convenience of illustration.

Figure 2 is a cross-sectional view, partly in elevation, taken on the line 2—2 of Figure 1, looking in the direction of the arrows, and showing the lumber stack as being completed, with part of the stack and part of the machine being broken away.

Figure 3 is a cross-sectional view taken on the line 3—3 of Figure 2, looking in the direction of the arrows, and illustrating the lumber pile in broken lines in order to show its position relative to the machine.

Figure 4 is an enlarged detail fragmentary cross-sectional view taken on the line 4—4 of Figure 3, looking toward the movable rack and chain assembly.

Figure 5 is an enlarged detail cross-sectional view taken on the vertical plane of line 5—5 of Figure 4, looking in the direction of the arrows, the chain track having been omitted for the purpose of clearer illustration.

Figure 6 is similar to Figure 5, this view, however, showing a layer of lumber lowered toward the stack of lumber with the rack disengaging from the layer to permit it to rest on the lumber stack, the chain track having been omitted from this figure.

Figure 7 is a fragmentary cross-sectional view illustrating the position of the lumber rack as it appears on striking the upper layer of a stack of lumber for dispensing the layer of lumber supported thereby on the stack, as illustrated in Figure 6.

Figure 8 is an enlarged fragmentary detail plan view of the conveyor chain for the green lumber, the receiving rack assembly, and the method of driving the conveyor chain, the view being taken on the horizontal plane of line 8—8 of Figure 2, looking in the direction of the arrows.

Figure 9 is an enlarged fragmentary detail cross-sectional view, taken on the line 9—9 of Figure 8, looking in the direction of the arrows.

Figure 10 is a diagrammatical electric wiring circuit for controlling the actuation of the present machine.

Figure 11 is a plan sectional view, taken on line 11—11 of Figure 2, illustrating how the operating switches are offset from one another.

Referring now more specifically to the drawings, the lumber stacking machine is seen to comprise a substantially open rectangular frame having legs 10, one leg being located at each corner of the machine. These legs are tied together by cross members 11 and longitudinal members 12 and 13, respectively, the members being braced by trusses 14 located on each side of the frame.

Disposed at both ends of the framework are vertically extending pairs of endless chains 15, the chains each being trained about the upper driving sprockets 16 and around lower idler sprockets 17. The sprockets 16 are keyed to confronting spaced and substantially parallel transverse shafts 18 which are journalled within bearings 19 mounted on the vertical legs 10. The lower idler sprockets 17 are journalled in the bearings 20 mounted on the lower ends of the legs 10, reference being made particularly to Figures 2 and 3 of the drawings.

The shafts 18 are geared together by the cross shaft 21 by way of the bevel gears 22, one of the gears 22 being disposed at each end of the cross shaft 21. The cross shaft 21 is driven from the motor 23 by way of the endless belt 24, the motor drive to be described in detail below. One or more shafts 25 are pivotally journalled in bearings 26 forming part of the pairs of chains 15 at each end of the machine.

Elongated racks 27 are rigidly secured to the shafts 25 and a bridged member 28 extends between and has its opposite ends supported between each pair of chains 15 at opposite ends of the machine, the member 28 being disposed adjacent the rack 27. The racks 27 have a longitudinal shoulder 29 adapted to support the lumber 30A, as best illustrated in Figures 2 to 6, inclusive, the shoulder being held on a horizontal plane by the action of the spring 31. One end of the spring 31 is anchored to the bearing 26 at 32 (see Figure 4), while the opposite end is anchored to the adjustable collar 33. The rack 27 extends upwardly and rearwardly at 34, terminating in a transverse member or heel 35. The spring 31 tends to bias this heel for constant movement toward and against the cross member 28, as shown in Figure 5, while the lumber is being mounted on the rack.

The chains 15 travel in channels or guideways 36 which maintain them in aligned position during their operation. The conveyor chains 37 are driven by sprockets 38 which are keyed to a cross shaft 39. The shaft 39 is journalled in bearings 40 mounted on brackets 41, which in turn form part of the longitudinal member 42 of the framework of the machine. These chains travel over supporting channels or guides 43 which are fixedly secured to the framework by way of the spacing members 44, by welding or other suitable means.

The chains 37 are only partially shown in the drawings, but it is to be understood that they lead from the source of lumber supply. The lumber 30 is moved along by the dogs 45, forming part of the chains 37, as is best illustrated in Figures 8 and 9. The shaft 39 is driven from the motor 46 through the countershaft 47 and the chain 48. The motor 46 and countershaft 47 are mounted on a platform or bracket 49, which is fixed to the vertical leg 10 by any suitable means, as for example, by welding.

The stacker operates in the following manner. Lumber 30 is conveyed to the rack 27 by the action of the feed chains 37, and when the lumber slides across the rack 27 to the point shown in Figure 2 of the drawings, it will contact the roller 50 which forms part of the lever 51.

The lever 51 is pivotally mounted on the bracket 52 at 53, referring particularly to Figures 1, 2 and 10. When the lever 51 has pivoted from the dotted line position in Figure 2 to its full line position as shown therein the motor 46 is deenergized and the driving of the feed chains 37 is stopped in the following manner.

Located on the chain 15 is a pawl 54. This pawl engages the plunger 55 of the switch 56, holding the switch bar 57 closed when the rack is in the loading position, as shown. When the lumber engaged the lever 51 it pushed the same in the direction of the arrow. This opened the switch 58 at the end 59 of the lever, engaging the plunger 60 opening the switch bar 61. This opens the electric circuit through the relay 62, stopping the motor 46.

The motor 46 was energized when the lever 51 was in the broken line position in the following manner, referring to Figure 10. Electric energy flowed from the main line 63 by way of the conductor 64, conductor 65, through the switch bar 61, conductor 66, switch bar 57 of the switch 56, conductor 67, through the solenoid 68 of the relay 62, conductor 69 back to the main line 70. This closed the relay switch bar 71 so that the motor 46 and the solenoid 72 receives energy from the main line 63 by way of the conductor 73 through the solenoid 72, conductor 74 through the switch bar 71 of the relay 62, conductor 75 to the motor 46, through the conductor 76, conductor 77, conductor 69 back to the main line 70. The motor 46 will continue to operate until the lumber 30A reaches the lever 51, at which time the switch bar 61 will be opened, allowing the relay 62 to open, opening the circuit through the motor 46 and the solenoid 72.

The solenoid 72 operates an electric brake shoe 78, which is normally held in contact with the brake drum 79 forming part of the motor 46. This brake shoe is normally engaging the drum 79 by the action of the spring 80 until the motor 46 is started and the solenoid 72 energized. This will release the brake shoe 78 from the drum 79, and the instant this circuit is open the spring 80 will apply the brake to the motor, stopping it instantly.

When the lever 51 was moved to the position shown in the drawing, it closed the switch 81 by striking the plunger 82. This will close the electric circuit through the motor 23, which will drive the chains 15 through the belt 24, shaft 21, bevel gears 22, allowing the rack 27 to lower the lumber 30A to the top of the pile of lumber 30B, as illustrated in Figure 6.

When the rack moves down it will strike the corner 83 of the pile of lumber 30B, as indicated in Figure 7, pulling the shoulder 29 from under the lumber 30A, allowing the lumber 30A to drop down on the pile of lumber 30B as indicated in Figure 6. The tip 84 will slide down against the end of the pile 30B by the action of the springs 31 until the tip of the rack clears the bottom of the stack of lumber, at which time the spring 31 will return the same in the direction of the arrow 35A to the position shown in Figure 5. The chain will continue to revolve until reaching the position in Figure 5.

When this happens the switch 85 will be opened by the pawl 86 on the chain 15, referring to Figures 2 and 10. This will stop the motor 23 and apply its brake shoe 87 by the action of the spring 88. The electric circuit to accomplish the above action is set forth below.

When the rack is in the position shown in the drawings, having been completely loaded with lumber 30A, the lever 51 will have been forced to the position shown, which will close the switch 81. As above described, the switch 58 will have been opened at the same time, stopping the operation of the motor 46 and the chains 37. Energy will flow from the main line 63, conductor 64, conductor 89, solenoid 90, conductor 91 through the switch 81, conductor 92 through the switch 93, conductor 77, conductor 69 to the main line 70. In the drawings, the switch 93 is shown in opened position. This is the case when the stack of lumber 30B has reached its full height at which time the switch 93 will be held opened and the above circuit cannot be completed.

Assuming that the lumber has not reached its full height and the switch arm 93A of the switch 93 is open, the circuit above described will be closed. When the solenoid 90 was energized it closed the switch bar 94 with the conductor 95 leading to the switch 85. It also closed the switch bar 96 with the conductor 97 which caused energy to flow from the main line 63, conductor 64, solenoid 99, releasing the brake shoe 87; also supplying energy through the motor 23 through the conductor 100, conductor 101, through the conductor 97, switch bar 96, conductor 98 back to the main line 70.

When the motor 23 started, it moved the chain downwardly as indicated by the arrow, lowering the layer of lumber 30A. The cam 86, referring to Figure 10, will allow the switch 85 to close, but at the same time the lever 51 will move to the broken line position allowing the switch 81 to open, therefore when the switch 85 closed it became a holding circuit for the relay R through the following circuit.

Energy will flow from the main line 63, conductor 64, conductor 89, solenoid 90, conductor 91, conductor 102, switch 85, conductor 95, switch bar 94, conductor 98 back to the main line 70 continuing to hold the relay switch closed until opened in the following manner. When the chain 15 made a complete revolution the cam 86 will open the switch 85 opening the above electric circuit allowing the relay 89A to open, breaking the motor circuit through the switch bars 94 and 96 stopping the motor and allowing the spring 88 of the brake shoe 87 to apply the brake instantly, stopping the motor 23. The rack 27 will then be in line with the feed chain 37, as illustrated in the drawings.

When the chains 15 come to the position shown in Figure 10, the plunger 55 will close the switch 56, which again will close the relay 62 starting the motor 46 driving the chain 37 as above described loading the rack 27 with the lumber 30A. The movement of the chains 37 will be stopped when the lever 51 is again moved to the full line position, which will open the switch 58 allowing the relay 62 to open, stopping the motor 46. Then, as above described, the switch 81 will be closed completing an electric circuit through the relay solenoid 90, starting the motor 23, and if the lumber pile 30B has not reached the point shown in Figures 8 and 10, the above circuit will be completed, starting the motor and lowering the rack 27 as above described.

In the event the lumber pile 30B has reached its full height, holding the switch 93 open, the motor 23 will not start, The forks of the lumber carrier is then brought under the stack of lumber at the point 104 removing the same from under the stack in the direction of the arrow, 103, Figure 2. After this is done the switch 93 will close starting the motor 23 and lowering the rack 27 with the lumber 30A onto the supporting beam 105. While but one rack has been shown, it will be understood that a plurality thereof could be mounted on the chains 15.

Having described and illustrated one embodiment of this invention in detail, it will be understood that the same is offered merely by way of example, and that the invention is to be limited only by the scope of the appended claims.

What is claimed is:

1. A lumber stacker comprising a substantially rectangular frame having a pair of opposed ends and sides, said frame having downwardly extending supporting legs at each corner thereof, a pair of spaced confronting parallel vertical chains at each end of said frame, means for mounting said chains for rotation on said legs at each of said ends, a plurality of pairs of transversely extending elongated support beams each having oppositely disposed ends, said oppositely disposed ends being journalled respectively in said confronting chains, means for driving said pair of chains to motivate said support beams, an endless lumber conveyor belt secured to said frame, means for driving said belt to discharge lumber on a selected pair of said support beams, and means for effecting alternate movement of said lumber conveyor belt and said pairs of vertical chains.

2. A lumber stacker comprising a substantially rectangular horizontal frame having a pair of front supporting legs and a pair of opposing rear supporting legs, a drive sprocket and an idler sprocket rotatably secured in spaced vertical relationship with respect to each other on each of said legs, said sprockets on said front legs being disposed in confronting relation with said sprockets on said opposing rear legs, parallel endless chains mounted for rotation on said sprockets on each of said legs, a plurality of pairs of transversely extending supporting bars, each of said bars having a pair of opposed ends, said bars being disposed between said confronting chains in horizontally spaced relation and having their ends respectively pivotally mounted on said chains, means for driving said chains in synchronized movement, an endless lumber conveyor belt fixedly secured to said rear legs so as to discharge lumber onto a selected pair of said supporting bars, means for driving said lumber conveyor belt, and means for automatically alternating the movement of said chains and said conveyor belt.

3. A lumber stacker comprising a substantially open rectangular frame having a pair of front legs and a pair of opposing rear legs, each of said legs having a vertically spaced drive sprocket and idler sprocket rotatably mounted thereon, an endless drive chain trained about each pair of drive and idler sprockets on said legs, said sprockets on said front legs facing rearwardly and said sprockets on said rear legs facing forwardly in confronting relation with respect to each other, a pair of transverse shafts journalled in said confronting drive sprockets, said shafts having a bevel gear fixedly secured thereto at one end thereof, a longitudinally extending drive shaft rotatably mounted on said frame, said drive shaft having a bevel gear at each end thereof meshing with said bevel gears on said transverse shafts, motor means for driving said drive shaft, a plurality of pairs of transversely extending support rods, each of said rods having a pair of opposed ends, said ends being respectively pivotally journalled in sockets secured to said chains, a rack bar fixedly secured to each of said rods, said rack bars being disposed in horizontal spaced and parallel relation, lumber conveyor means having the discharge end thereof fixedly secured to said frame adjacent said rack bars for conveying lumber thereto, means motivating said conveyor means, and automatic control means for alternately actuating said motivating means.

4. A lumber stacker comprising a substantially open rectangular frame having a pair of oppositely disposed front and rear legs, each of said legs having a vertically spaced drive and idler sprocket rotatably mounted thereon, an endless drive chain trained about each pair of drive and idler sprockets on said legs, said sprockets on said front legs facing rearwardly and said sprockets on said rear legs facing forwardly in confronting relation with respect to each other, a pair of transverse shafts journalled in said confronting drive sprockets, said shafts having a gear fixedly secured thereto at one end thereof, a longitudinally extending drive shaft rotatably mounted on said frame, said drive shaft having a gear at each end thereof meshing with said gears on said transverse shafts, electric motor means for driving said drive shaft, a plurality of pairs of transversely extending support rods, each of said rods having a pair of opposed ends, said ends being respectively pivotally journalled in sockets secured to said chains, a rack bar fixedly secured to each of said rods, said rack bars being disposed in horizontal spaced and parallel relation, lumber conveyor means having the discharge end thereof fixedly secured to said frame adjacent said rack bars for conveying lumber thereto, electric means motivating said conveyor means, automatic control means for alternately actuating said electric motor means and said conveyor means, said automatic control means comprising a pair of electric circuits including a circuit for said motor means and a circuit for said conveyor means, and switch means for alternately energizing one or the other of said circuits.

References Cited in the file of this patent

UNITED STATES PATENTS

| | | |
|---|---|---|
| 674,262 | Duncan et al. | May 14, 1901 |
| 1,188,138 | Baker et al. | June 20, 1916 |
| 1,342,463 | Sanwo | June 8, 1920 |
| 1,440,716 | Bliss | Jan. 2, 1923 |
| 2,407,782 | Hardy | Sept. 17, 1946 |